Patented July 25, 1950

2,516,107

UNITED STATES PATENT OFFICE 2,516,107

MONOCYCLIC AMINOBENZENE COMPOUNDS CONTAINING FLUORINE

Joseph B. Dickey, Rochester, N. Y., assignor to Eastman Kodak Company, Rochester, N. Y., a corporation of New Jersey No Drawing. Application October 26, 1945, Serial No. 624,943

3 Claims. (Cl. 260—573)

This invention relates to monocyclic aminobenzene compounds containing a nuclear amino group which is substituted with an aliphatic hydrocarbon group having a difluorinated carbon atom.

The compounds of my invention constitute valuable dye intermediates being useful in most instances as coupling components for the preparation of azo dyes. They are also useful for the production of intermediates for color photography. It is an object of my invention to provide new monocyclic aminobenzene compounds containing fluorine. Another object of my invention is to provide new aminobenzene compounds containing fluorine which are useful as dye intermediates and for the production of intermediates for color photography. A further object is to provide a satisfactory process for the preparation of the new aminobenzene compounds containing fluorine.

While my invention relates broadly to monocyclic aminobenzene compounds containing a nuclear amino group which is substituted with an aliphatic hydrocarbon group having a difluorinated carbon atom, it relates more particularly to monocyclic aminobenzene compounds containing a nuclear amino group which is substituted with a low carbon aliphatic hydrocarbon group having a difluorinated carbon atom. By a low carbon aliphatic hydrocarbon group is meant one containing 1, 2, 3, or 4 carbon atoms. Ordinarily the nuclear amino group will be substituted with a 2,2-difluoroethyl (—CH$_2$CHF$_2$) group. Compounds having the general formula:

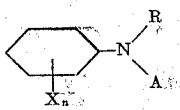

wherein R is hydrogen or an aliphatic group, A is a low carbon aliphatic hydrocarbon group having a difluorinated carbon atom, X is a low carbon alkyl group, a low carbon alkoxy group, a halogen atom or a low carbon aliphaticacylamino group and n is 0, 1 or 2 appear to be advantageous.

The nuclear amino group of the monocyclic aminobenzene compound can be substituted with either one or two aliphatic hydrocarbon groups having a carbon atom which is difluorinated. Normally, only one such aliphatic group will be present. Where two such aliphatic groups are present, they can be the same group or different groups.

The aminobenzene compounds of the invention can be prepared by reacting a chlorobenzene compound with a difluoroalkylamine. If desired a catalyst for the reaction such as powdered copper and cuprous oxide can be employed. The aminobenzene compounds of the invention can also be prepared by reaction between an aminobenzene and a difluoroalkanol in the presence of a metallic hydrogenation catalyst, such as Raney nickel and other nickel catalysts, a cobalt catalyst and copper chromite. A still further method by which the compounds of the invention can be prepared is by reaction between an aminobenzene compound and a difluoroalkyl halide in the presence of an acid binding agent. Acid binding agents that can be used include, for example, sodium carbonate, potassium carbonate, sodium hydroxide, potassium hydroxide, sodium bicarbonate, potassium bicarbonate and barium hydroxide. Each of these methods of preparation is illustrated hereinafter.

Difluoroalkylamines that can be used in the preparation of the compounds of my invention include, for example, 2,2 - difluoroethylamine (CHF$_2$CH$_2$NH$_2$), di - (2,2 - difluoro)-diethylamine (CHF$_2$CH$_2$)$_2$NH, 2,2 - difluoro - n - propylamine (CH$_3$CF$_2$CH$_2$NH$_2$) and 3,3-difluoro-n-butylamine (CH$_3$CF$_2$CH$_2$CH$_2$NH$_2$). Difluoroalkyl halides that can be employed include, for example, BrCHF$_2$, ClCHF$_2$, ClCH$_2$CHF$_2$, BrCH$_2$CHF$_2$, ICH$_2$CHF$_2$, ClCH$_2$CF$_2$CH$_3$ and ClCH$_2$CH$_2$CF$_2$CH$_3$. Difluoroalkanol compounds that can be employed include, for example, 2,2-difluoroethanol (CHF$_2$CH$_2$OH).

In the interest of simplicity, the term difluoroethyl is frequently used throughout the specification instead of 2,2-difluoroethyl. It will be understood that whenever the term difluoroethyl is used herein, 2,2-difluoroethyl is intended.

The following examples illustrate the compounds of my invention and the process used to prepare them.

*Example 1.—N-(2,2-difluoroethyl)-aniline*

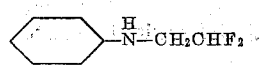

28 grams of chlorobenzene, 81 grams of 2,2-difluoroethylamine, 300 cc. of water, 0.25 gram of copper powder and 0.25 gram of cuprous oxide are heated together in a copper lined shaking autoclave at 220–225° C. for 24 hours with shaking. When cool, the contents of the autoclave are removed and extracted with benzene. After drying, the benzene extract is fractionally distilled under reduced pressure to recover N-(2,2-difluoroethyl)-aniline and unreacted 2,2-difluoroethyl-amine. N-(2,2-difluoroethyl) aniline is a colorless liquid.

Using the procedure described in Example 1 and employing the proper chlorobenzene compound, the following compounds are readily prepared:

N-difluoroethyl-o-toluidine
N-difluoroethyl-o-ethylaniline
N-difluoroethyl-o-anisidine
N-difluoroethyl-m-toluidine
N-difluoroethyl-m-anisidine
N-difluoroethyl - 2 - methoxy - 5 - methylaniline
N-difluoroethyl-2-methoxy-5 - acetaminoaniline
N-difluoroethyl-3-acetaminoaniline By the use of 2,2-difluoro-n-propylamine, 3,3-difluoro-n-butylamine and di-(2,2-difluoro)-diethylamine, respectively, in place of 2,2-difluoroethylamine in Example 1, N-(2,2-difluoro-n-propyl)-aniline, N-(3,3-difluoro - n - butyl)-aniline and N,N-di(2,2-difluoroethyl)-aniline, respectively, are obtained. It will be understood that by the use of these amines, other aniline compounds containing a 2,2-difluoro-n-propyl group, a 3,3-difluoro-n-butyl group or two 2,2-difluoroethyl groups on the nuclear amino group can be prepared. o-Toluidine, o-ethylaniline, o-anisidine, m-toluidine, m-anisidine, 2-methoxy-5-methylaniline, 2-methoxy-5-acetaminoaniline, m-acetaminoaniline and m-propionylaminoaniline, for example, are illustrative of the aniline compounds that may be so substituted. Thus, the following compounds can be prepared:

N-(2,2-difluoro-n-propyl)-o-toluidine
N-(2,2-difluoro-n-propyl)-2-methoxy-5-methylaniline
N-(2,2-difluoro - n - propyl)-m-propionylaminoaniline
N-(2,2-difluoro-n-propyl)-m-toluidine
N-(3,3-difluoro-n-butyl) - 2 - methoxy - 5 - acetaminoaniline
N-(3,3-difluoro-n-butyl)-o-anisidine
N-(3,3-difluoro-n-butyl)-m-acetaminoaniline
N-(3,3-difluoro-n-butyl)-o-ethylaniline
N,N-di-(2,2-difluoroethyl)-aniline
N,N-di-(2,2-difluoroethyl)-m-toluidine
N,N-di-(2,2-difluoroethyl)-m-chloraniline

*Example 2.—N-(2,2-difluoroethyl)-4-nitroaniline*

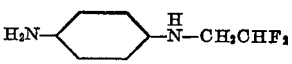

39.5 grams of p-nitrochlorobenzene, 81 grams of difluoroethylamine, 300 cc. of butyl alcohol, 0.25 gram of copper powder, 0.25 gram of cuprous oxide and 26.5 grams of sodium carbonate are heated in a copper lined shaking autoclave at 220–225° C. for 24 hours with shaking. When cool, the contents of the autoclave are removed and filtered. The filtrate is then fractionally distilled under reduced pressure (5 mm., for example), to recover butyl alcohol, unreacted difluoroethylamine and the desired product, N-(2,2-difluoroethyl)-4-nitroaniline.

Using the procedure of Example 2, the following compounds can be prepared:

N-(2,2-difluoro-n-propyl)-4-nitroaniline
N-(3,3-difluoro-n-butyl)-4-nitroaniline
N,N-di-(2,2-difluoroethyl)-4-nitroaniline

*Example 3.—N-(2,2-difluoroethyl)-p-phenylenediamine*

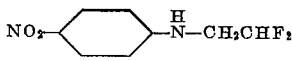

This compound is prepared by reducing N-(2,2-difluoroethyl)-4-nitroaniline. The reduction can be carried out with tin and hydrochloric acid or more preferably with hydrogen under pressure in the presence of a catalyst such as Raney nickel. Similarly, the following compounds can be prepared:

N-(2,2-difluoro-n-propyl)-p-phenylenediamine
N-(3,3-difluoro-n-butyl)-p-phenylenediamine
N,N-di-(2,2-difluoroethyl)-p-phenylenediamine

*Example 4.—N-(2,2-difluoroethyl)-m-toluidine*

47 grams of m-toluidine, 74 grams of 2,2-difluoroethanol and 5 grams of Raney nickel are heated together in a shaking autoclave for 25 hours. When cool, the contents of the autoclave are removed and filtered to remove nickel and the filtrate is fractionated under reduced pressure (6 mm., for example). N-(2,2-difluoroethyl)-m-toluidine is obtained in a good yield.

Using the procedure described in Example 4, the following compounds are readily prepared:

N-(2,2-difluoroethyl)-o-chloroaniline
N-(2,2-difluoroethyl)-o-anisidine
N-(2,2-difluoroethyl)-m-chloroaniline
N-(2,2-difluoroethyl)-m-n-butyrylaminoaniline
N-(2,2-difluoroethyl)-2,5-dimethoxyaniline
N-(2,2-difluoroethyl)-aniline.

*Example 5.—N-(2,2-difluoroethyl)-o-anisidine*

15 grams of 2,2-difluoroethylbromide, 12 grams of o-anisidine and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure to give a good yield of N-(2,2-difluoroethyl)-o-anisidine.

*Example 6.—N,N-di-(fluoroethyl)-m-toluidine*

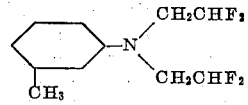

17 grams of N-difluoroethyl-m-toluidine, 15 grams of difluoroethylbromide and 6 grams of sodium carbonate are placed in a suitable reaction vessel and heated under refluxing conditions until carbon dioxide ceases to be evolved. The reaction product is extracted with ethyl alcohol and the ethyl alcohol extract is fractionated under reduced pressure (5 mm., for example) to give a good yield of N,N-di-(difluoroethyl)-m-toluidine.

*Example 7.—N-trifluoroethyl-N-difluoroethyl-m-toluidine*

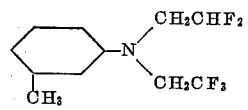

This compound is obtained by reacting N-difluoroethyl-m-toluidine with 2,2,2-trifluoroethylbromide (CF₃CH₂Br) in accordance with the procedure described in Example 6.

*Example 8.—N-difluoromethyl-N-difluoroethyl-m-toluidine*

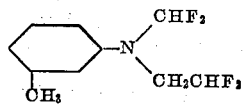

This compound is obtained by reacting N-difluoroethyl-m-toluidine with 2,2-difluoromethylbromide (BrCHF₂) in accordance with the procedure described in Example 6.

Following the procedure described in Examples 5, 6, 7 and 8, the following compounds are readily prepared:

N,N-di-(difluoromethyl)-aniline
N,N-di-(difluoromethyl)-m-toluidine
N,N-di-(difluoroethyl)-aniline
N,N-di-(difluoroethyl)-m-chloroaniline
N,N-di-(difluoroethyl)-m-anisidine
N,N-di-(2,2-difluoro-n-propyl)-aniline
N,N-di-(2,2-difluoro-n-propyl)-m-toluidine
N,N-di-(2,2-difluoro-n-propyl)-m-fluoroaniline
N,N-di-(3,3-difluoro-n-butyl)-aniline
N,N-di-(3,3-difluoro-n-butyl)-m-toluidine
N,N-di-(3,3-difluoro-n-butyl)-m-chloroaniline
N-difluoromethyl-N-difluoroethylaniline
N-difluoromethyl-N-difluoroethyl-m-chloroaniline
N-difluoromethyl-N-(2,2-difluoro-n-propyl)-aniline
N-difluoromethyl-N-(2,2-difluoro-n-propyl)-m-toluidine
N-difluoromethyl-N-(2,2-difluoro-n-propyl)-m-bromoaniline
N-difluoromethyl-N-(2,2-difluoro-n-propyl)-2,5-diethoxyaniline
N-difluoromethyl-N-(3,3-difluoro-n-butyl)-aniline
N-difluoromethyl-N-(3,3-difluoro-n-butyl)-m-toluidine
N-trifluoroethyl-N-difluoromethylaniline
N-trifluoroethyl-N-difluoromethyl-m-propylaniline
N-trifluoroethyl-N-difluoroethylaniline
N-trifluoroethyl-N-difluoroethyl-o-toluidine
N-trifluoroethyl-N-difluoroethyl-m-butoxyaniline
N-(3,3,3-trifluoropropyl)-N-difluoromethylaniline
N-(3,3,3-trifluoropropyl)-N-difluoromethyl-m-ethylaniline
N-(3,3,3-trifluoropropyl)-N-difluoroethylaniline
N-(3,3,3-trifluoropropyl)-N-difluoroethyl-m-toluidine
N-(3,3,3-trifluoropropyl)-N-(2,2-difluoro-n-propyl)-aniline
N-(3,3,3-trifluoropropyl)-N-(3,3-difluoro-n-butyl)-aniline
N-4,4,4-trifluorobutyl)-N-difluoromethylaniline
N-(4,4,4-trifluorobutyl)-N-difluoroethylaniline
N-(4,4,4-trifluorobutyl)-N-(2,2-difluoro-n-propyl)-aniline
N-(4,4,4-trifluorobutyl)-N-(3,3-difluoro-n-butyl)-aniline
N-β-methoxyethyl-N-difluoroethylaniline
N-β-ethoxyethyl-N-difluoroethylaniline
N-β-methoxyethyl-N-difluoroethyl-m-toluidine
N-β-methoxyethyl-N-(3,3-difluoro-n-butyl)-aniline Compounds containing the 3,3,3-trifluoropropyl (—CH₂CH₂CF₃) group and the 4,4,4-trifluorobutyl (—CH₂CH₂CH₂CF₃) group be prepared by using an equivalent gram molecular weight of ClCH₂CH₂CF₃ and ClCH₂CH₂CH₂CF₃, respectively, in place of the trifluoroethylbromide and difluoromethylbromide compounds of Examples 7 and 8 and using the general procedure described in these examples.

*Example 9.—N-β-hydroxyethyl-N-difluoroethylaniline*

15.7 grams of N-difluoroethylaniline, 5 grams of ethylene oxide and 50 cc. of dioxane are heated together with stirring in an autoclave at 180° C. for six hours. Upon cooling, the reaction mixture is removed from the autoclave and distilled under reduced pressure. A good yield of N-β-hydroxyethyl-N-difluoroethylaniline is obtained.

Using the procedure described in Example 9 and employing the proper alkylene oxide (trimethylene oxide, propylene oxide, glycidol, and β-methyl glycidol), the following compounds are readily prepared:

N-β-hydroxypropyl-N-difluoroethylaniline
N-γ-hydroxypropyl-N-difluoroethylaniline
N-β,γ-dihydroxypropyl-N-difluoroethylaniline
N-4,5-dihydroxyamyl-N-difluoroethylaniline
N-β,γ-dihydroxypropyl-N-difluoromethylaniline
N-β-hydroxyethyl-N-difluoromethylaniline
N-β-hydroxyethyl-N-difluoromethyl-m-toluidine
N-β,γ-dihydroxypropyl-N-difluoroethyl-m-toluidine
N-β-methyl-β,γ-dihydroxypropyl-N-difluoroethylaniline
N-β-methyl-β,γ-dihydroxypropyl-N-difluoroethyl-m-toluidine
N-β-hydroxyethyl-N-difluoroethyl-m-butoxyaniline
N-β,γ-dihydroxypropyl-N-2,2-difluoro-n-propyl-m-toluidine
N-β,γ-dihydroxypropyl-N-3,3-difluoro-n-butyl-m-toluidine where a β,γ-dihydroxypropyl group or other group which will decompose if the compound is attempted to be distilled is present, the reaction mixture is removed from the reaction vessel, filtered if desired and the solvent material removed by distillation under reduced pressure, leaving the desired product as a residue of the distillation.

*Example 10.—N-β-hydroxyethyl-N-difluoroethyl-m-chloroaniline*

19.1 grams of N-difluoroethyl-m-chloroaniline, 5 grams of ethylene oxide and 50 cc. of dioxane are heated together with stirring in an autoclave at 180° C. for 6 hours. Upon cooling, the reaction mixture is removed from the autoclave and distilled under reduced pressure. A good yield of N-β-hydroxyethyl-N-difluoroethyl-m-chloroaniline is obtained.

*Example 11.—N-β,γ-dihydroxypropyl-N-difluoroethyl-2-methoxy-5-acetaminoaniline*

24.4 grams of N-difluoroethyl-2-methoxy-5-acetaminoaniline and 10.6 grams of sodium carbonate are mixed together and heated with stirring in a suitable reaction vessel in an atmosphere of nitrogen to 140° C. Then 12 grams of glycerolchlorohydrin (ClCH₂CHOHCH₂OH) are added drop by drop with stirring over a period of three hours, while maintaining the temperature at 140° C. When carbon dioxide ceases to be evolved, the reaction mixture is extracted with acetic acid and the acetic acid extract is carefully fractionated under reduced pressure to remove the acetic acid. N-β,γ-dihydroxypropyl-N-difluoroethyl-2-methoxy-5-acetaminoaniline is obtained as a dark, viscous product and is stored in a stoppered bottle.

Where the intermediate is to be used as a coupling component in the preparation of azo dyes the fractionation operation may be omitted and the acetic acid extract stored and used as such. If desired, the reaction mixture can be extracted with butyl alcohol and the desired product recovered by removing the butyl alcohol by distillation or evaporation.

*Example 12.—N - β,γ - dihydroxypropyl - N - difluoroethyl-m-toluidine*

17.1 grams of N-difluoroethyl-m-toluidine and 10.6 grams of sodium carbonate are mixed together and heated with stirring in a suitable reaction vessel in an atmosphere of nitrogen to 140° C. Then 12 grams of glycerol chlorohydrin are added drop by drop with stirring over a period of three hours, while maintaining the temperature at 140° C. When carbon dioxide ceases to be evolved, the reaction mixture is extracted with acetic acid and the acetic acid extract is carefully fractionated under reduced pressure (5 mm., for example) to remove the acetic acid. N - β,γ - dihydroxypropyl - N - difluoroethyl - m-toluidine is obtained as a dark, viscous product and is stored in a stoppered bottle. If desired, the reaction product can be recovered by extraction with butyl alcohol as indicated above.

The process described in Examples 11 and 12 is broadly applicable. In place of the chlorohydrin used in the examples ethylene chlorohydrin, trimethylene chlorohydrin, β - methyl - β,γ - dihydroxypropylchlorohydrin, propylene chlorohydrin and 1-chloro-2,3,4-trihydroxybutane, for example, can be used to obtain compounds of the invention.

Using the procedures described in Examples 9, 10, 11 and 12, the following compounds are readily prepared:

N - β,γ - dihydroxypropyl - N - difluoromethyl-m-chloroaniline

N - 4,5 - dihydroxyamyl - N - difluoromethyl - m-toluidine

N - β - hydroxyethyl - N - difluoroethyl - m - toluidine

N - β - hydroxyethyl - N - difluoroethyl - o - toluidine

N - β - hydroxyethyl - N - difluoroethyl - o - anisidine

N - β - hydroxyethyl - N - difluoroethyl - m - anisidine

N - β - hydroxyethyl - N - difluoroethyl - m - bromoaniline

N - β - hydroxyethyl - N - difluoroethyl - m - fluoroaniline

N - β - hydroxyethyl - N - difluoroethyl - 2-methoxy-5-methylaniline

N - β - hydroxyethyl - N - difluoroethyl - 2-methoxy-5-acetaminoaniline

N - β - hydroxyethyl - N - 3,3 - difluoro - n - propylaniline

N - β - hydroxyethyl - N - 4,4 - difluoro - n-butylaniline

N - β - hydroxypropyl - N - difluoromethyl - m-toluidine

N - β - hydroxypropyl - N - difluoroethyl - m-toluidine

N - β - hydroxypropyl - N - difluoroethyl - m-anisidine

N - β - hydroxypropyl - N - difluoroethyl - 2 - methoxy-5-methylaniline

N - β - hydroxypropyl - N - difluoroethyl - 2,5-dimethoxyaniline

N - β - hydroxypropyl - N - difluoroethyl - 2-ethoxy-5-acetaminoaniline

N - β - hydroxypropyl - N - difluoroethyl - m-chloroaniline

N - γ - hydroxypropyl - N - difluoroethyl - m-toluidine

N - γ - hydroxypropyl - N - difluoroethyl - 2-methoxy-5- chloroaniline

N - γ - hydroxypropyl - N - (2,2 - difluoro - n-propyl) -aniline

N - β,γ - dihydroxypropyl - N - difluoroethyl - m-butyrylaminoaniline

N - β,γ - dihydroxypropyl - N - (2,2 - difluoro - n-propyl) -aniline

N - β,γ - dihydroxypropyl - N - (3,3 - difluoro-n-butyl) -aniline

N - 4,5 - dihydroxyamyl - N - (2,2 - difluoro - n-propyl) -aniline

N - 4,5 - dihydroxyamyl - N - (3,3 - difluoro - n-butyl) -aniline

N - β - methyl - β,γ - dihydroxypropyl - N - (2,2-difluoro-n-propyl) -aniline

N - β - methyl - β,γ - dihydroxypropyl-N-(3,3-difluoro-n-butyl) -aniline

N - 2,3,4 - trihydroxybutyl - N - difluoroethylaniline

N - 2,3,4 - trihydroxybutyl - N - (2,2-difluoro - n-propyl) -aniline

N - 2,3,4 - trihydroxybutyl - N - (3,3-difluoro-n-butyl) -m-toluidine

*Example 13.—N - β - cyanoethyl - N - difluoroethylaniline*

18 grams of N-difluoroethylaniline, 30 grams of acrylonitrile and 2 cc. of sulfuric acid are placed in a suitable reaction vessel and heated on a steam bath for several weeks. The sulfuric acid is then carefully neutralized by the addition of sodium hydroxide and the reaction mixture is fractionated under reduced pressure. A good yield of N-β-cyanoethyl-N-difluoroethylaniline is obtained.

Using the procedure described in Example 13, the following compounds are readily prepared:

N - β - cyanoethyl - N - difluoroethyl - m - toluidine

N - β - cyanoethyl - N - difluoroethyl - m-chloroaniline

N - β - cyanoethyl-N - difluoroethyl - 2 - methoxy-5-methylaniline

N - β - cyanoethyl - N - (2,2 - difluoro - n - propyl) -aniline

N - β - cyanoethyl - N - (3,3-difluoro - n - butyl) -aniline

*Example 14.—Ethyl ester of N - β - carboxyethyl-N-difluoroethylaniline*

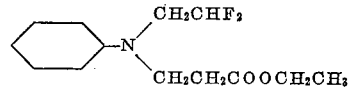

17.5 grams of the ethyl ester of N-β-carboxyethylaniline, 15.1 grams of difluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure, 5 mm., for example, to give a good yield of the ethyl ester of N-β-carboxyethyl-N-difluoroethylaniline.

Using the procedure described in Example 14, the following compounds are readily prepared:

Ethyl ester of N-β-carboxyethyl-N-difluoroethyl-m-toluidine

Ethyl ester of N-β-carboxyethyl-N-difluoroethyl-m-chloroaniline

Ethyl ester of N-β-carboxyethyl-N-difluoroethyl-m-fluoroaniline

Ethyl ester of N-β-carboxyethyl-N-difluoroethyl-o-toluidine
Ethyl ester of N-β-carboxyethyl-N-(2,2-difluoro-n-propyl)aniline
Ethyl ester of N-β-carboxyethyl-N-(2,2-difluoro-n-propyl)-m-toluidine
Ethyl ester of N-β-carboxyethyl-N-(3,3-difluoro-n-butyl)aniline
Ethyl ester of N-β-carboxyethyl-N-(3,3-difluoro-n-butyl)-m-chloroaniline
Ethyl ester of N-β-carboxyethyl-N-difluoromethylaniline By the use of an equivalent gram molecular weight of the methyl ester of N-β-carboxyethylaniline for the ethyl ester of N-β-carboxyethylaniline of the example, the corresponding methyl ester compounds can be prepared.

*Example 15.—N-γ-ketobutyl-N-difluoroethylaniline*

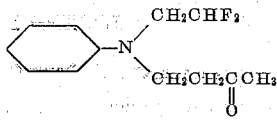

16 grams of N-γ-ketobutylaniline, 15.1 grams of difluoroethylbromide and 6 grams of sodium carbonate are placed in a suitable reaction vessel and heated under refluxing conditions until carbon dioxide ceases to be evolved. Upon cooling, the reaction mixture is extracted with ethyl alcohol and the ethyl alcohol extract is fractionated under reduced pressure (3 mm., for example) to give a good yield of N-γ-ketobutyl-N-difluoroethylaniline.

Using the procedure described in Example 15, the following compounds are readily prepared:
N-γ-ketobutyl-N-difluoroethyl-m-toluidine
N-γ-ketobutyl-N-difluoroethyl-o-toluidine
N-γ-ketobutyl-N-difluoroethyl-m-anisidine
N-γ-ketobutyl-N-difluoroethyl-m-chloroaniline
N-γ-ketobutyl-N-difluoroethyl-m-fluoroaniline
N-γ-ketobutyl-N-difluoroethyl-2-methoxy-5-methylaniline
N-γ-ketobutyl-N-difluoroethyl-2-methoxy-5-acetaminoaniline
N-β-ketopropyl-N-difluoroethylaniline
N-β-ketobutyl-N-difluoroethylaniline
N-γ-ketoamyl-N-difluoroethylaniline
N-γ-ketobutyl-N-(2,2-difluoro-n-propyl)-aniline
N-β-ketopropyl-N-(2,2-difluoro-n-propyl)-m-toluidine
N-γ-ketobutyl-N-(3,3-difluoro-n-butyl)-aniline
N-β-ketopropyl-N-(3,3-difluoro-n-butyl)-m-toluidine

*Example 16.—N-(6,6,6-trifluorohexyl)-N-difluoroethylaniline*

28 grams of chlorobenzene, 170 grams of 6,6,6-trifluorohexylamine, 300 cc. of water, 0.25 gram of copper powder and 0.25 gram of cuprous oxide are heated together in a copper-lined shaking autoclave at 220–225° C. for 24 hours with shaking. When cool, the contents of the autoclave are removed and extracted with benzene. After drying, the benzene extract is fractionally distilled under reduced pressure to recover N-(6,6,6-trifluorohexyl)-aniline and unreacted 6,6,6-trifluorohexylamine. 156 grams of 5,5,5-trifluoroamylamine can be substituted for the 6,6,6-trifluorohexylamine of the example to obtain N-(5,5,5-trifluoroamyl)-aniline. 23.1 grams of N-(6,6,6-trifluorohexyl)-aniline, 15.1 grams of difluoroethylbromide and 6 grams of sodium carbonate are placed in a suitable reaction vessel and heated under refluxing conditions until carbon dioxide ceases to be evolved. The reaction product is extracted with ethyl alcohol and the ethyl alcohol extract is fractionated under reduced pressure (2 mm., for example) to give a good yield of N-(6,6,6-trifluorohexyl)-N-difluoroethylaniline. Similarly, by the use of 21.7 grams of N-(5,5,5-trifluoroamyl)-aniline in the foregoing reaction, N-(5,5,5-trifluoroamyl)-N-difluoroethylaniline can be obtained.

Using the procedure described hereinbefore, the following compounds are readily prepared.

N-(5,5,5-trifluoroamyl)-N-difluoroethyl-2-methoxy-5-methylbenzene
N-(5,5,5-trifluoroamyl)-N-difluoroethyl-m-toluidine
N-(5,5,5-trifluoroamyl)-N-(2,2-difluoro-n-propyl)-aniline
N-(6,6,6-trifluorohexyl)-N-difluoroethyl-m-toluidine
N-(6,6,6-trifluorohexyl)-N-(3,3-difluoro-n-butyl)-aniline It will be understood that the foregoing examples are intended to be illustrative and not limitative of my invention. To illustrate the compounds of Example 2 can be treated in accordance with the procedure described herein to introduce a second group into the amino group. Thus, the following compounds can be readily prepared:

N-β-hydroxyethyl-N-difluoroethyl-4-nitroaniline
N-β-hydroxypropyl-N-difluoroethyl-4-nitroaniline
N-γ-hydroxypropyl-N-difluoroethyl-4-nitroaniline
N-β,γ-dihydroxypropyl-N-difluoroethyl-4-nitroaniline
N-4,5-dihydroxyamyl-N-difluoroethyl-4-nitroaniline
N,N-di-(difluoroethyl)-4-nitroaniline
N-2,2-difluoroethyl-N-trifluoroethyl-4-nitroaniline
N-3,3-difluoro-n-propyl-N-trifluoroethyl-4-nitroaniline
N-β-methoxyethyl-N-difluoroethyl-4-nitroaniline
N-β-ethoxyethyl-N-difluoroethyl-4-nitroaniline
N-β-carboxyethyl-N-difluoroethyl-4-nitroaniline
Methyl ester of N-β-carboxyethyl-N-difluoroethyl-4-nitroaniline
Ethyl ester of N-β-carboxyethyl-N-difluoroethyl-4-nitroaniline The difluoroethyl group present in each of the compounds above named can be replaced by the other difluoroalkyl groups disclosed herein and these compounds as well as the compounds resulting from the reduction of the nitro group, of the compounds under discussion, to an amino group, as illustrated in Example 3, for example, are included within the scope of my invention.

As previously indicated the compounds of the invention are useful in the preparation of azo dye compounds. Thus compounds capable of coupling can be coupled with diazotized aromatic compounds to form azo dyes. Aromatic amines that can be employed include, for example, p-nitroaniline, o-chloro-p-nitroaniline, o-bromo-p-nitroaniline, o-cyano-p-nitroaniline, o-chloroaniline, p-aminoacetophenone and 2,4-dinitro-6-chloroaniline. These amines when diazotized and coupled with the coupling compounds of our invention yield dyes which can be used for the coloration of cellulose organic esters, especially cellulose acetate, and nylon. Thus the dye formed by coupling diazotized p-nitroaniline with N-difluoroethylaniline colors cellulose acetate and nylon textile materials red shades while that from diazotized o-chloro-p-nitroaniline and N-β-hydroxyethyl - N - difluoroethyl-m-toluidine colors cellulose acetate and nylon textile materials rubine shades. The dye formed from diazotized p-aminoacetophenone and N-di-fluoroethyl-m-toluidine colors cellulose acetate and nylon textile materials orange shades.

Compounds of my invention containing a diazotizable free amino group can be diazotized and coupled with p-cresol, N-(di-β-hydroxyethyl) - aniline, N - β,γ - dihydroxypropyl - m - toluidine and N-β-hydroxyethyl-m-chloroaniline, for example, to obtain dye compounds which color cellulose acetate and nylon textile materials. To illustrate, the dye compound formed by coupling diazotized N-difluoroethyl-p-phenylenediamine with p-cresol or that formed by coupling diazotized N-β-hydroxyethyl-N-difluoroethyl-p-phenylenediamine with N-(di-β-hydroxyethyl)-aniline color cellulose acetate and nylon textile materials yellow shades. Similarly, the dye compounds formed by coupling these last two named diazotized compounds with dimethyldihydroresorcinol (5,5 - dimethyl - cyclohexandione - 1,3) color cellulose acetate and nylon textile materials red shades.

Monocyclic aminobenzene compounds containing a nuclear amino group which is substituted with an aliphatic hydrocarbon group having a trifluorinated carbon atom are described and claimed in my copending application, Ser. No. 624,942 filed October 26, 1945.

I claim:
1. A compound selected from the group of compounds consisting of N-β-hydroxyethyl-N-2,2-difluoroethylaniline, and N-β,γ-dihydroxypropyl-N-2,2-difluoroethyl-m-toluidine.
2. The compound having the formula:

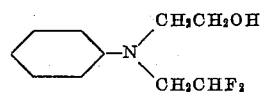

3. The compound having the formula:

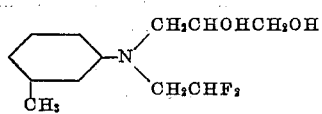

JOSEPH B. DICKEY.

REFERENCES CITED

The following references are of record in the file of this patent:

UNITED STATES PATENTS

| Number | Name | Date |
|---|---|---|
| 2,082,156 | Felix et al. | June 1, 1937 |
| 2,118,661 | Baumann | May 24, 1938 |
| 2,136,171 | Maier | Nov. 8, 1938 |
| 2,153,018 | Heyna et al. | Apr. 4, 1939 |
| 2,173,417 | Huber | Sept. 19, 1939 |
| 2,194,927 | Daudt et al. | Mar. 26, 1940 |
| 2,240,968 | Van Melsen | May 6, 1941 |

FOREIGN PATENTS

| Number | Country | Date |
|---|---|---|
| 209,089 | Switzerland | June 17, 1940 |